United States Patent
Phadke et al.

(10) Patent No.: US 7,209,370 B2
(45) Date of Patent: Apr. 24, 2007

(54) CIRCUIT FOR REDUCING LOSSES AT LIGHT LOAD IN A SOFT SWITCHING FULL BRIDGE CONVERTER

(75) Inventors: Vijay Gangadhar Phadke, Pasig (PH); Arlaindo Vitug Asuncion, Parañaque (PH); Israel Gomez Beltran, Rizal (PH)

(73) Assignee: Astec International Limited, Hong Kong (HK)

( * ) Notice: Subject to any disclaimer, the term of this patent is extended or adjusted under 35 U.S.C. 154(b) by 167 days.

(21) Appl. No.: 10/912,808

(22) Filed: Aug. 6, 2004

(65) Prior Publication Data

US 2005/0030767 A1 Feb. 10, 2005

Related U.S. Application Data

(60) Provisional application No. 60/493,632, filed on Aug. 9, 2003.

(51) Int. Cl.
*H02M 3/335* (2006.01)
(52) U.S. Cl. .......................................... 363/17; 363/132
(58) Field of Classification Search .................. 363/17, 363/132
See application file for complete search history.

(56) References Cited

U.S. PATENT DOCUMENTS

| | | | |
|---|---|---|---|
| 4,864,479 A * | 9/1989 | Steigerwald et al. .......... 363/17 |
| 5,132,889 A | 7/1992 | Hitchcock et al. ............ 363/17 |
| 5,189,601 A | 2/1993 | Sellers ........................ 363/21 |
| 5,245,520 A * | 9/1993 | Imbertson ..................... 363/17 |
| 5,663,873 A * | 9/1997 | Bhagwat et al. ............... 363/17 |
| 5,764,494 A * | 6/1998 | Schutten et al. ............... 363/17 |
| 5,808,879 A * | 9/1998 | Liu et al. ....................... 363/17 |
| 5,946,200 A * | 8/1999 | Kim et al. ..................... 363/17 |
| 6,016,258 A | 1/2000 | Jain et al. ...................... 363/17 |
| 7,136,294 B2 * | 11/2006 | Phadke et al. .............. 363/132 |

* cited by examiner

*Primary Examiner*—Jeffrey Sterrett
(74) *Attorney, Agent, or Firm*—Nixon Peabody LLP

(57) ABSTRACT

A circuit for reducing power loss for a soft switching full bridge converter at light loads and enabling very high frequency operation without using a cold plate approach. The circuit preferably includes a resonant inductor and blocking inductor on the converter's primary side arranged so as to provide reduced losses for a zero voltage switching bridge converter. The circuit provides these benefits even for converters having a power transformer with very low leakage inductance. The circuit is not dependent on the presence of a high leakage inductance for the power transformer. The circuit can also be used in soft switching half bridge converters. The circuit can also be used in a hard switching full bridge or half bridge converter for achieving zero voltage switching at reduced cost with reduced losses at light load, if the duty cycle of the converter is set near fifty percent.

18 Claims, 15 Drawing Sheets

CIRCUIT FOR REDUCING LOSSES AT LIGHT LOAD IN A SOFT SWITCHING FULL BRIDGE CONVERTER

CROSS REFERENCE TO RELATED APPLICATION

This application claims the benefit of U.S. Provisional Application No. 60/493,632, filed Aug. 9, 2003, which is incorporated by reference herein.

FIELD OF INVENTION

The present invention relates in general to power converter circuits and more particularly to zero voltage switching (ZVS) half bridge and full bridge converters and a circuit that reduces the high power loss at very light loads for such converters operating at high frequency.

BACKGROUND OF INVENTION

The modern technology trend is towards higher density and lower profile electrical devices. This trend has driven a demand for improving the power density of power supplies. As a result, various techniques have been developed to increase the switching frequencies of the power supply in order to reduce the size and bulk of magnetic components and filtering elements. Problems experienced with increasing the operating frequencies include higher switching losses and the generation of worse electromagnetic interference (EMI). Since the switching losses in power semiconductors are directly proportional to the operating frequency, thermal management is also a big challenge, since the space saved by using smaller filtering components is more than offset by the need for larger heat sinks.

The development of a method of soft switching power supplies addressed most of the above problems. For the DC/DC conversion stage, the soft, zero voltage switching (ZVS) method for the power switches eliminated turn on losses. At the same time, this method improved EMI performance by lowering fast rising switching currents. Thus, the method significantly improved the efficiency of the power converter and enabled switching at higher frequencies. The demand for higher power density, however, is increasing unabated. New problems are surfacing as the soft, ZVS converter is being switched at ever higher frequencies. Conventional soft switching converters switching at high frequencies are exhibiting high power losses during light load conditions. As a result, although such converters are very efficient at full load, they are prone to failure at light loads. Many semiconductor manufacturers attribute this failure to various semiconductor phenomena, such as the reverse recovery speed of the MOSFET body diode, and the construction of the MOSFET's channel, etc. One other significant problem, however, is that it is difficult to charge and discharge the output capacitance of the MOSFET bridge switching elements at light loads when the converter is in the hard switching mode. This is because the energy stored in the resonant choke in such converters is very low and therefore cannot charge/discharge the output capacitance of the bridge switching elements. This is true for converters having a primary side resonant choke or a saturable choke on the secondary side. This problem exists in all known ZVS control techniques. In fact, this drawback at light load for conventional soft switching converters is even worse than for conventional hard switching bridge converters.

FIG. 1 illustrates a worst case scenario when the power supply is at no-load. At no-load, the only energy available for ZVS switching is the magnetizing current of the power transformer. Since this current is typically very low, it cannot charge/discharge the MOSFET switch capacitance in the required delay time.

As shown in FIG. 1, the circuit on the left side shows a bridge circuit 10 with a transformer primary winding. Since the transformer magnetizing current is very low at a no-load condition, negligible energy is stored in the primary winding or in any series resonant choke. The series resonant choke for the circuit in FIG. 1 could be the leakage inductance of the transformer or any external inductance. Since the energy stored in the magnetizing inductance is very low, it cannot enable ZVS of the bridge elements, and thus, can be neglected in the analysis. The bridge circuit 20 on the right side in FIG. 1 shows this worst case scenario where the transformer winding has no effect.

To analyze the circuit in FIG. 1, it is first assumed that an active diagonal is operating, e.g., switches Qa and Qd are on. At the end of the active period, switch Qd will turn off. The voltage across it will not rise since there is no charging current available. As a result, the voltage across Qd will remain close to zero during the dead time at the end of the active period. Thus, the MOSFET switch Qd output capacitance, shown as capacitor Cd, is at zero volts and fully discharged and the capacitance across switch Qc, shown as capacitor Cc, is fully charged at the Bulk+voltage shown. In typically operating soft switching converters, switch Qc will be turned on after a short delay. When switch Qc turns on, the energy stored in capacitor Cc is fully discharged in switch Qc. At the same time, as the lower end of the switch Qc rises to the Bulk+voltage level, the capacitance Cd of the lower switch Qd also gets charged through switch Qc. Thus, there are two kinds of resistive losses in switch Qc: one due to the discharging of capacitor Cc and other due to the charging of capacitor Cd. These losses result in power dissipation which is proportional to the operating frequency as represented in the following formula:

$$P\text{turn-on} = (0.5 \times Cc \times (V\text{bulk})^2 \times Fsw) + (0.5 \times Cd \times (V\text{bulk})^2 \times Fsw)$$

Where Fsw is the switching frequency. Assuming Ca=Cb=Cc=Cd:

$$P\text{turn-on} = Cc \times (V\text{bulk})^2 \times Fsw$$

These resistive losses, and the resulting power dissipation, may be tolerable at lower switching frequencies in the range of 100 kHz to 200 kHz. At much higher frequencies, e.g., above 400 kHz, however, these losses predominant such that the total power lost in the bridge switches at light loads exceeds the losses at full-load. This predominance is illustrated in FIG. 1A for a typical soft switching full bridge converter. FIG. 1A shows total losses in the entire converter versus the load percentage. At light loads, most of this total loss is due to losses in the bridge switching devices.

FIG. 2 is a circuit diagram of an exemplary prior art full bridge power converter 30 where a primary side resonant inductor is used for achieving soft, zero voltage switching. As is seen, a resonant inductor Lr is inserted in series with the primary of the power transformer. Inductor Lr could also be the parasitic leakage inductance of the transformer. FIG. 2A is a set of voltage and current waveforms illustrating the operation of the power converter in FIG. 2. A simplified representation of switches Qa, Qb, Qc, and Qd is shown in FIGS. 2–4 such that the switch capacitances of the corresponding switches are not shown. The existence of the switch capacitances is well known in the art. For reference, the switch capacitances are as shown in bridge 20 for switches Qa, Qb, Qc, and Qd in FIG. 1.

During the active period of the switching diagonal, e.g., Qa and Qd are on, energy is stored in inductor Lr due to the primary current flowing through it. When one of the diagonal MOSFET switches (e.g., Qd) turns off, the energy stored in inductor Lr is used to charge that MOSFET's output capacitance and to discharge the output capacitance of the other MOSFET in the same vertical leg. As a result, ZVS action is achieved.

In addition to the fact that the circuit topology in FIG. 2 has the drawback of losses at light load at higher frequencies, since the capacitance of each MOSFET switch is intrinsic and does not change with frequency, the size of the resonant inductor Lr is independent of frequency. As a result it may be quite large for a high frequency power supply. Inductor Lr is also lossy since it handles very high primary full load currents and its flux swings in both directions, generating high core losses. The series inductor in FIG. 2 also introduces a delay, e.g., 200 nS, which reduces the available maximum duty cycle of the converter. This delay is a serious drawback at higher frequencies.

FIG. 3 is an exemplary prior art full bridge converter 40 where two saturable inductors, Ls1 and Ls2, are connected in series with the secondary side's rectifier diodes. In operation, for an active transformer period when diagonal Qa–Qd is conducting, the dotted end of the secondary is positive and D1 is forward biased, providing current to the output load through inductors Ls1 and Lout. This current saturates inductor Ls1. At the end of the active period, Qd turns off and the secondary voltage starts to fall. Since Ls1 is saturated and Ls2 is in blocking mode since D2 is reverse biased, this forces the current in output inductor Lout to keep flowing through the upper half of the secondary, i.e., D1-Ls1. This DC inductor current also has an AC component in the form of ripple current. The transformer action causes this ripple current to be reflected back to the primary side, which forces the primary current to keep flowing while achieving ZVS action. Similar ZVS action is repeated by Ls2 in the next active period.

Although the circuit in FIG. 3 achieves ZVS action satisfactorily at higher loads, it still has the drawback of losses at light load at higher frequencies. At frequencies above 200 kHz, for example, the core losses in the secondary side saturable cores of Ls1 and Ls2 are very high and could result in thermal runaway for the square loop amorphous cores typically used. The blocking effect of these saturable inductors also reduces the available duty cycle.

FIG. 4 shows a prior art full bridge converter 50 including two external resonant inductors Lr1, Lr2 and two split capacitors C1, C2 to generate a split bulk+voltage rail. FIG. 4A is a set of voltage and current waveforms illustrating the operation of the power converter in FIG. 4. In operation, when the diagonal full bridge devices, e.g., Qa, Qd, are in conduction, current flows in the respective inductor (Lr1, Lr2) and energy is stored. At the end of the active period when the switch, e.g., Qd, turns off, the energy stored in the inductor is utilized to achieve the ZVS transition.

The prior art converter 50 shown in FIG. 4 may provide zero voltage switching down to very light loads for all four full bridge MOSFETs, Qa, Qb, Qc and Qd, if the power transformer is non-ideal, i.e., has high leakage inductance, and thus may be able to address the problem of losses at light load. However, this circuit has several drawbacks. The circuit in FIG. 4 requires the inclusion of two inductors, Lr1, Lr2, and two capacitors, C1, C2. The ripple current stress on the capacitors can be significant, such that capacitors of higher cost are required. Instead of using such costly capacitors, each of these bulk capacitors can alternatively be split into a series combination of two. The drawback of this solution is that this greater number of capacitors will occupy a larger volume, thereby creating an inefficient use of the available space. Another drawback of the circuit in FIG. 4 is that any inequality between the values of C1 and C2 or between the values of Lr1 and Lr2 can create problems with the current mode control of the circuit.

Another drawback of this circuit is as follows. The circuit in FIG. 4 can provide satisfactory ZVS transition from the active to the passive state. During the transition from the passive to the active state, however, the energy in inductors Lr1 and Lr2 can flow through the transformer and be transferred to the load instead of achieving ZVS transition of the passive to active leg. This drawback is lessened in applications having a large transformer leakage inductance, but for transformers with very low leakage inductance, this problem in the converter 50 shown in FIG. 4 may result in some hard switching of one leg of the bridge.

The heat sink for most power supplies is designed to accommodate heat dissipation at full-load. Although a cooling fan is typically provided for the power supply, the fan is typically controlled such that fan speed is a function of the load. Thus, at light loads, the dissipation in bridge switches is higher than at full-load and much less cooling air is available. As a result, these devices may fail due to thermal runaway. Prior art devices have addressed this failure mode through a "cold plate" approach. In this approach, the bridge switches are mounted on the same large heat sink used for cooling the boost converter or secondary rectifiers. Since the power losses in the boost converter or output rectifiers are negligible at light loads, the large heat sink can handle the extra losses in the bridge devices at light load, and thereby avoid thermal runaway. This cold plate approach is inefficient and cannot meet more demanding efficiency requirements at light load conditions. The cold plate approach also complicates the construction of the power supply as several safety requirements must be met as well, e.g., requiring insulation on the secondary side, thus rendering this approach inconsistent with high density requirements.

A circuit is therefore needed which solves the above described drawbacks of losses at light load in high frequency soft switching power converters.

SUMMARY OF THE INVENTION

The present invention overcomes the drawbacks of power loss at light loads for soft ZVS half bridge and full bridge converters by providing a circuit that reduces the internal power losses of the soft switching full bridge converter at light loads and enables very high frequency operation without using a full cold plate approach.

An advantage of the present invention is that is provides design flexibility for practical applications.

Another advantage of the present invention is that it reduces the component cost since the ZVS inductor can be made using cheaper materials and dissipates lower power.

Another advantage of the present invention is that it lowers EMI at all load conditions.

Still another advantage of the present invention is that, unlike conventional ZVS converters, the value of the ZVS inductance reduces with increased operating frequency, thereby enabling higher density packaging by reducing component size.

Broadly stated, the present invention provides, in a DC-DC converter for providing substantially zero voltage switching (ZVS) having first and second input terminals to which an input DC voltage is coupled and two output terminals where the output DC power is provided, a bridge having a first and second switching leg, each leg comprising two controlled switches connected in series, each switch having a switch capacitance and a control input, each switching leg connected between the input terminals and having a junction point between its series-connected switches, a transformer having a primary winding and a secondary winding each having a first and second end, and a rectifier and output filter circuit coupled between the secondary winding and the output terminals, a circuit for reducing power losses at light loads and enabling very high frequency operation comprising a first inductor connected between the junction points for charging and discharging the switch capacitances; and a second inductor for providing high impedance to a sudden reversal of current having an end connected to the junction point of the first switching leg and another end connected to the first end of the primary winding, the second end of said primary winding is connected to the junction point of the second switching leg.

Broadly stated, the present invention also provides a DC-DC converter for providing substantially zero voltage switching (ZVS) having first and second input terminals to which an input DC voltage is coupled and two output terminals where the output DC power is provided comprising a bridge having a first and second switching leg, each leg comprising two controlled switches connected in series, each switch having a switch capacitance, each switching leg connected between the input terminals and having a junction point between its series-connected switches; a transformer having a primary winding and a secondary winding each having a first and second end; a rectifier and output filter circuit coupled between the secondary winding and the output terminals; a first and a second diode; a first inductor connected in series with the first diode between the junction points; and a second inductor connected in series with the second diode between the junction points; wherein the first diode has a cathode connected to an end of the first inductor and an anode connected to the junction point of the second switching leg and the second diode has a cathode connected to the anode of the first diode and an anode connected to an end of the second inductor; and a third inductor for providing high impedance to a sudden reversal of current having an end connected to the junction point of the first switching leg and another end connected to the first end of the primary winding, the second end of the primary winding is connected to the junction point of the second switching leg.

Broadly stated, the present invention also provides a DC-DC converter for providing substantially zero voltage switching (ZVS) having first and second input terminals to which an input DC voltage is coupled and two output terminals where the output DC power is provided comprising a bridge having a switching leg comprising two controlled switches connected in series, each switch having a switch capacitance, the switching leg connected between the input terminals and having a junction point between its series-connected switches, a transformer having a primary winding and a secondary winding each having a first and second end, a rectifier and output filter circuit coupled between the secondary winding and the output terminals; a capacitive voltage divider formed by a first and a second capacitor and connected between the input terminals, a first inductor connected between the junction point of the switching leg and a junction between the first and second capacitor; and a second inductor for providing high impedance to a sudden reversal of current having an end connected to the junction between the capacitors and another end connected to the first end of the primary winding, the second end of the primary winding is connected to the junction point of the switching leg.

Broadly stated, the present invention also provides a method of operating a bridge DC-DC converter for substantially zero voltage switching, the converter having first and second input terminals to which an input DC voltage is coupled and two output terminals where the output DC power is provided and which comprises a bridge having two switching legs, each leg comprising two controlled switches connected in series, each switch having a switch capacitance and a control input, each switching leg connected between the input terminals and having a junction point between its series-connected switches, a transformer having a primary winding and a secondary winding each having a first and second end, and a secondary circuit for deriving an output of the converter from the secondary winding, comprising the steps of supplying substantially complementary control signals to the control inputs of the switches in the first switching leg so that the corresponding switches conduct alternately with dead times therebetween; supplying relatively phase shifted substantially complementary control signals to the control inputs of the switches in the second switching leg so that the corresponding switches conduct alternately with dead times therebetween; and during the dead time when one of the switches in the first switching leg has been turned off, charging the switch capacitance of the turned-off switch and discharging the switch capacitance of the other the switch in the first switching leg via a resonant inductor connected between the junction points; and during the dead time when one of the switches in the second switching leg has been turned off, charging the switch capacitance of the turned-off switch and discharging the switch capacitance of the other the switch in the second switching leg via the resonant inductor connected between the junction points.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

Reference symbols or names are used in the Figures to indicate certain components, aspects or features shown therein, with reference symbols common to more than one Figure indicating like components, aspects or features shown therein.

DETAILED DESCRIPTION OF THE INVENTION

Figure 1:
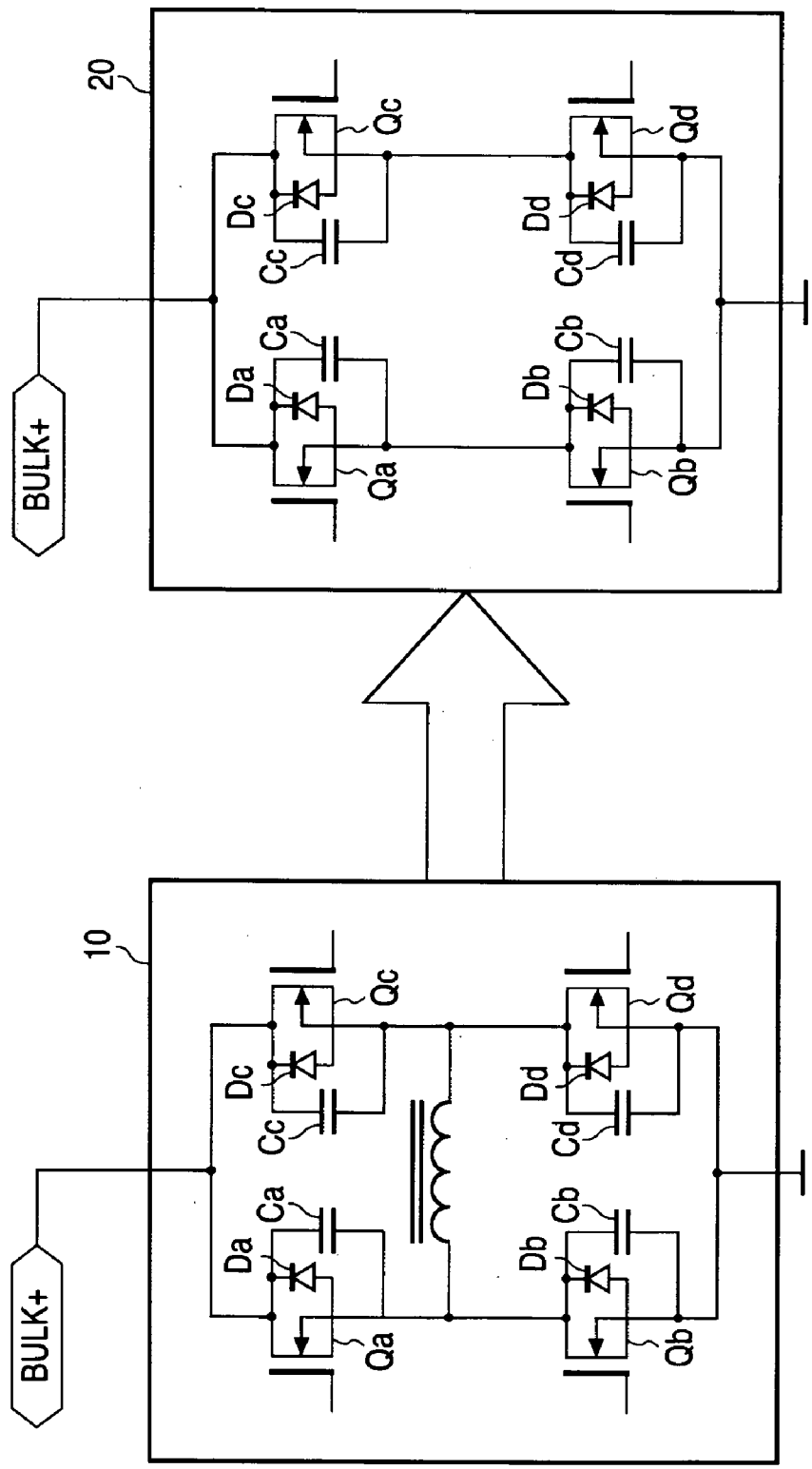
FIG. 1 shows two prior art circuits to illustrate the worst case scenario when a full bridge power supply is at no-load.
Figure 1A:
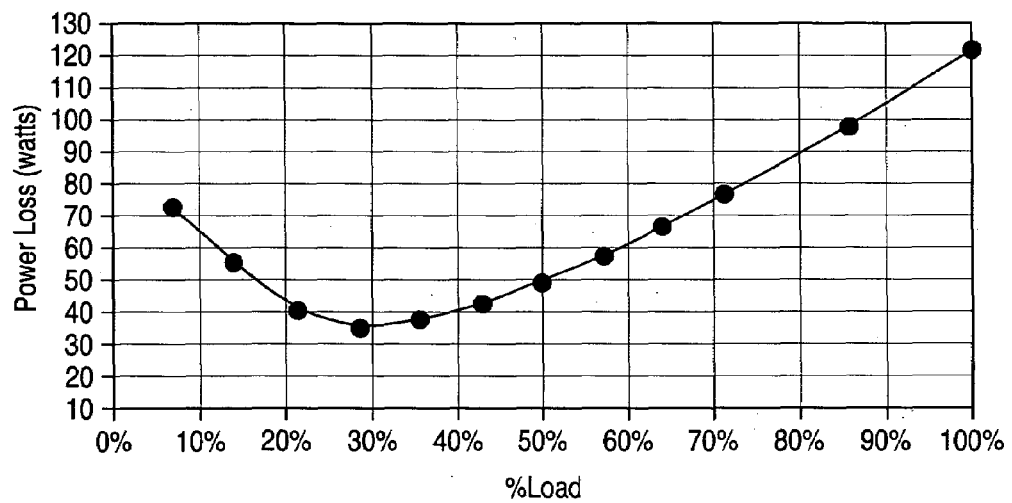
FIG. 1A illustrate a waveform showing power loss versus load for a typical prior art ZVS full bridge converter.
Figure 5A:
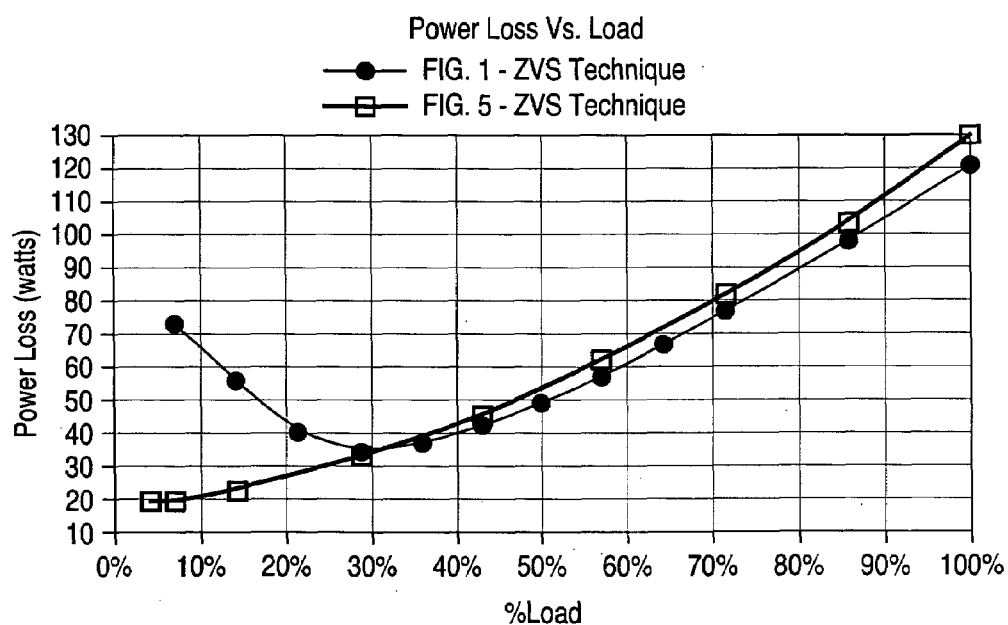
FIG. 5A is an exemplary waveform of power loss versus load for the converter shown in FIG. 5 as compared to the prior art converter shown in FIG. 1.
Figure 5:
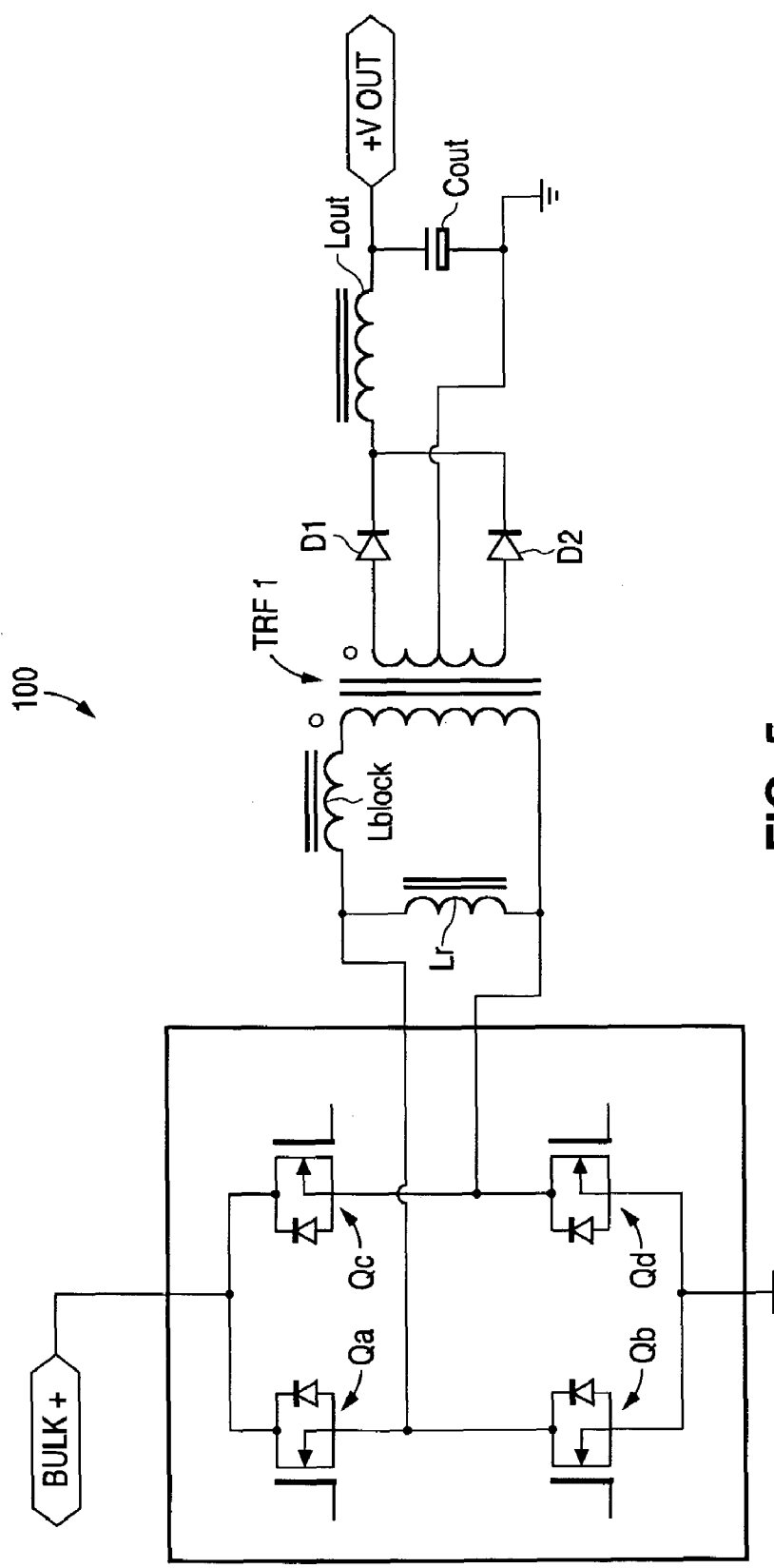
FIG. 5 is a preferred embodiment of the circuit according to the present invention.

A preferred embodiment of a circuit according to the present invention is shown at 100 in FIG. 5. Converter 100 includes a resonant inductor Lr and a blocking inductor Lblock as seen in FIG. 5. Resonant inductor Lr is connected across the output terminals of a bridge 110. Inductor Lr is parallel to the series combination of the transformer primary and a blocking inductor Lblock. A simplified representation of switches Qa, Qb, Qc, and Qd is shown in FIGS. 5–8 such that the switch capacitances of the corresponding switches are not shown. The existence of the switch capacitances is well known in the art. For reference, the switch capacitances are as shown in bridge 20 for switches Qa, Qb, Qc, and Qd in FIG. 1.

In operation, when a bridge diagonal, e.g., Qa, Qd, activates, current builds up through the primary winding after overcoming the blocking period of Lblock. At the same time, current builds up in Lr in the same direction, while storing energy therein. At the end of the active period when the switch Qd turns off, the energy in inductor Lr is used to charge the switch capacitance of switch Qd, e.g., Cd (not shown) and discharge the switch capacitance of switch Qc, e.g., Cc (not shown) during the active to passive state transition. The bridge switches are preferably MOSFETs as shown in FIG. 5. Just before the next diagonal conduction, switch Qa turns off and the voltage at the top end of switch Qb starts to fall due to current flowing in inductor Lr. This current flow provides the charging of switch Qa and the discharging of switch Qb for the ZVS transition. For the converter in FIG. 5, if Lblock was missing, there is a potential for problems in the passive to active leg transition. As the upper end of switch Qb starts to fall, the current in inductor Lr may just circulate in the transformer primary, resulting in partial hard switching of this leg. Lblock provides a block to quickly prevent this reversal of current and the energy in inductor Lr is available for the ZVS transition. Similarly, in the next diagonal operation of switch Qc and switch Qb, current builds up in the primary and inductor Lr in the other direction and the same ZVS action described above occurs.

In FIG. 5, Lblock is chosen to act like a switch that would close after a short delay after reversal of voltage across it. Lblock could be a saturable choke or any kind of inductor which offers high impedance to a sudden reversal of current. It is not required nor expected that inductor Lblock stores energy. In an alternative embodiment, for particular applications where the transformer has a high enough leakage inductance, Lblock could be omitted.

Figure 9:
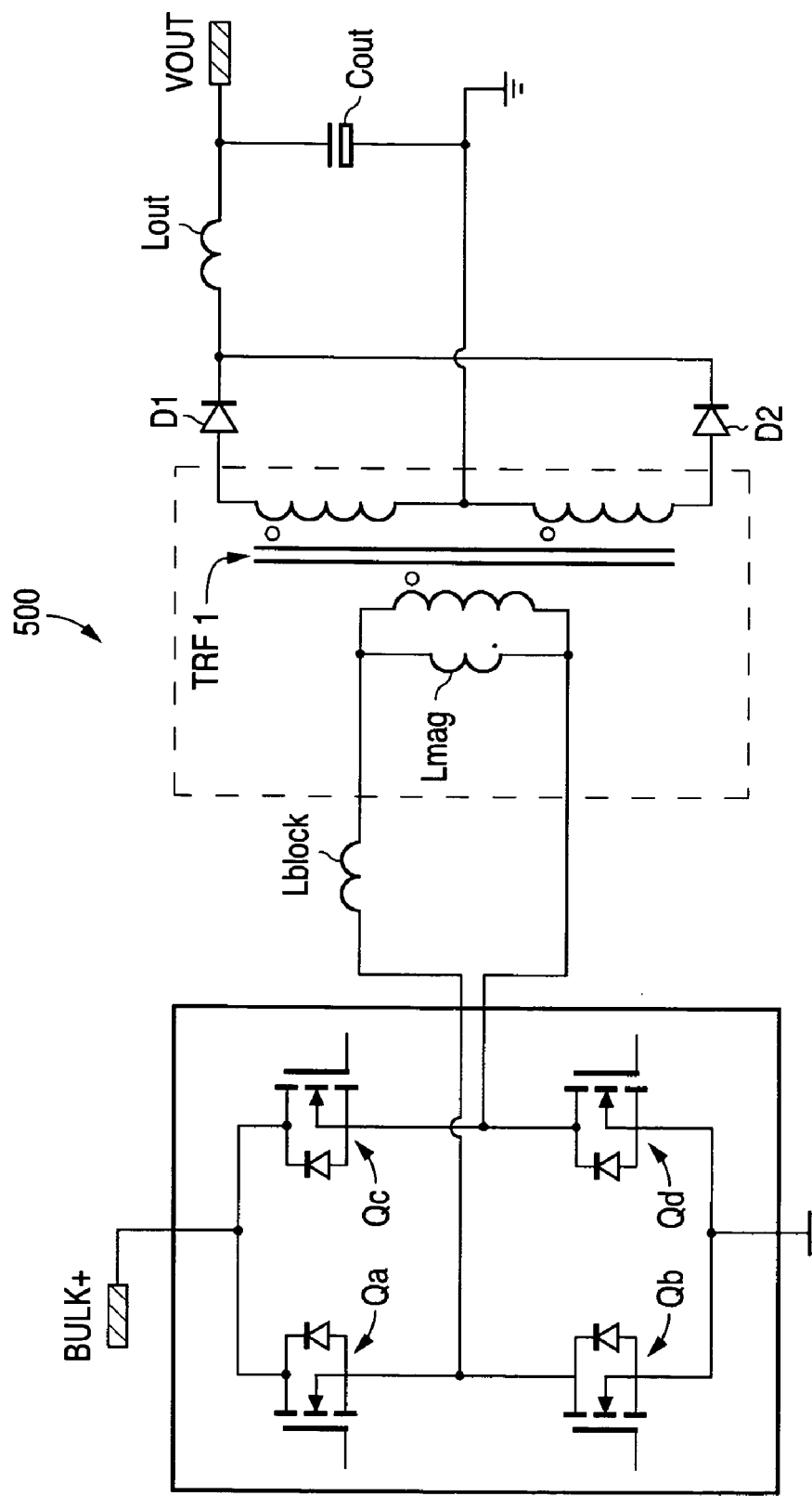
FIG. 9 is an alternative embodiment of the circuit in FIG. 5 wherein the resonant inductor Lr is integrated in the power transformer as a magnetizing inductance by gapping the core.

An alternative embodiment wherein the resonant inductor Lr is integrated in the power transformer as a magnetizing inductance, Lmag, by gapping the core, is shown at 500 in FIG. 9.

Figure 2:
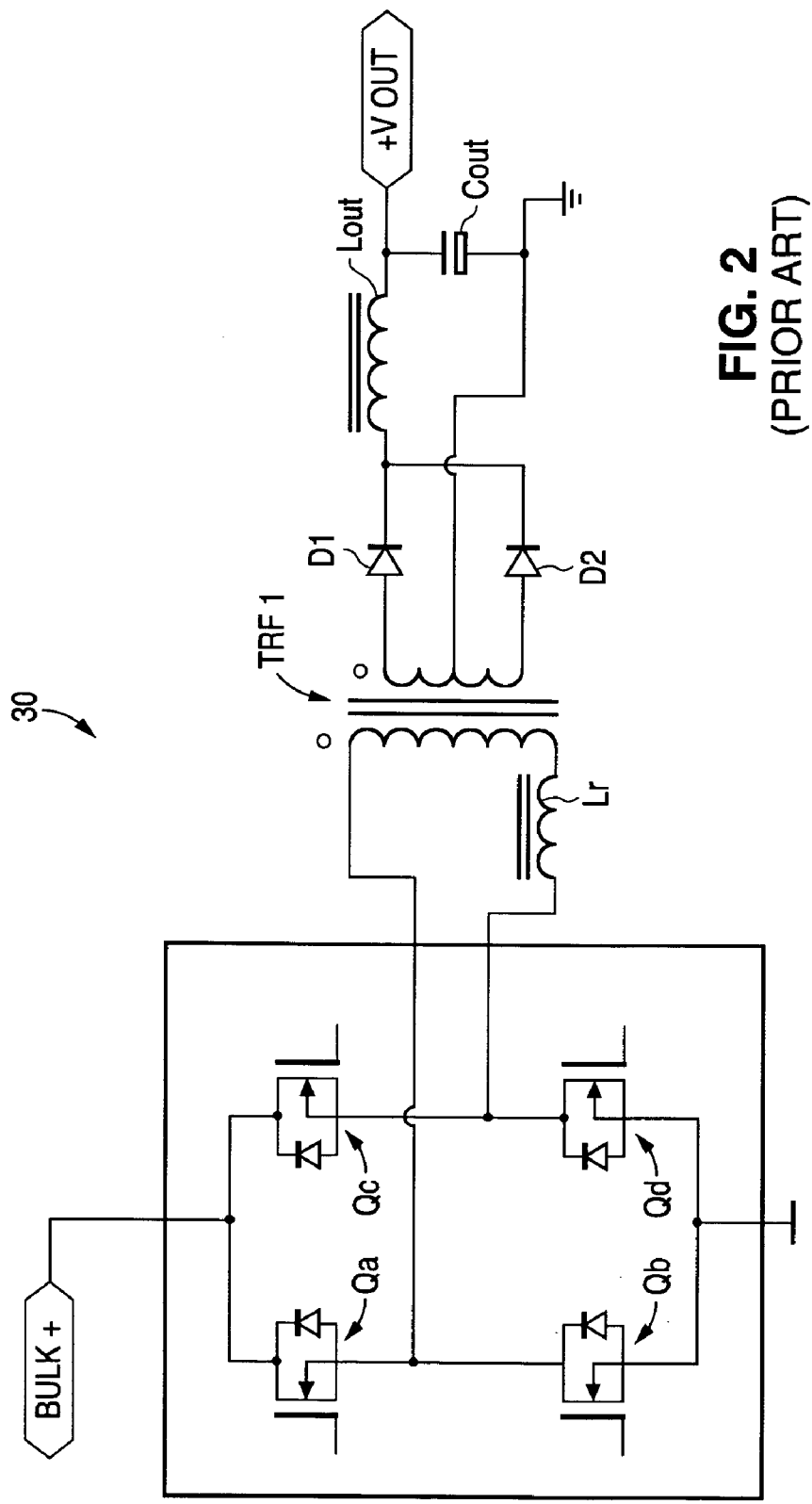
FIG. 2 is a circuit diagram of a prior art full bridge power converter having a primary side resonant inductor for achieving soft, zero voltage switching.
Figure 2A:
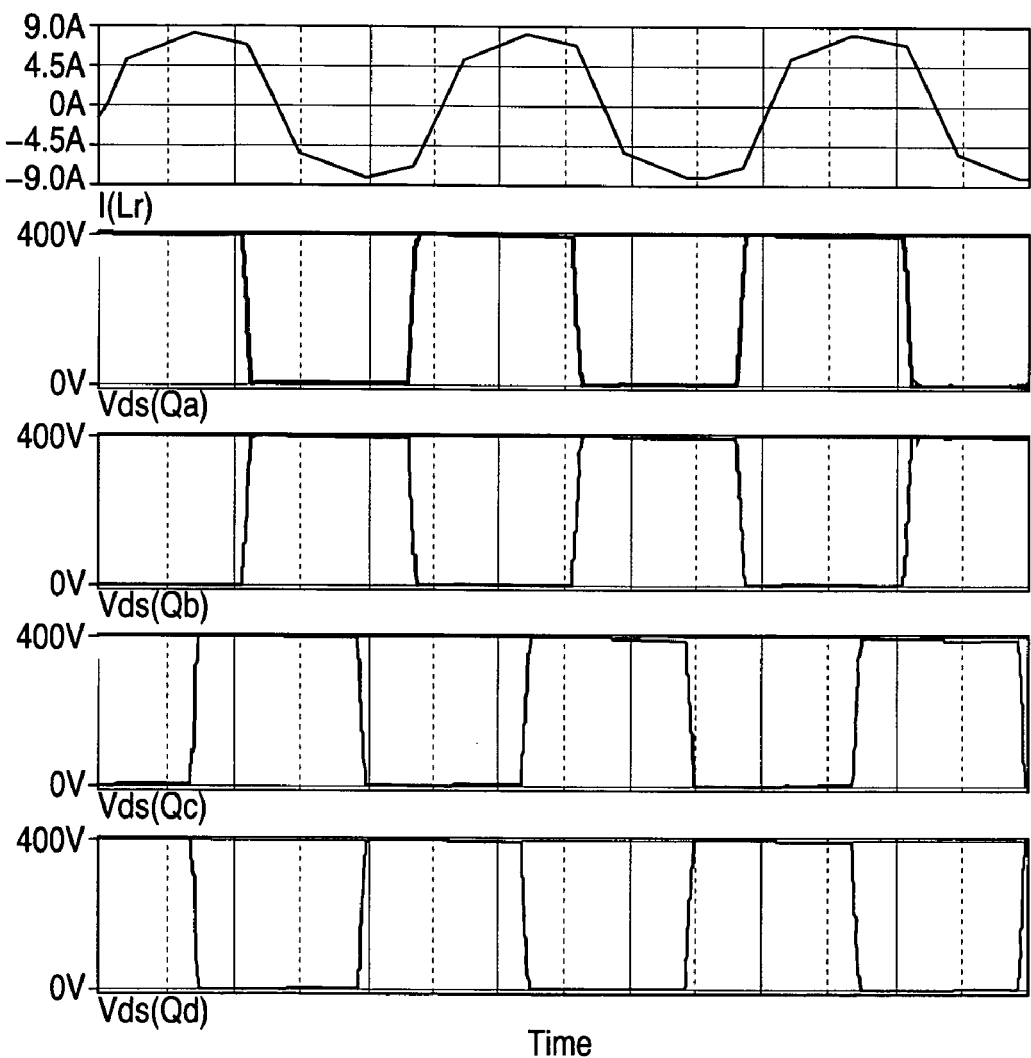
FIG. 2A is a set of voltage and current waveforms illustrating the operation of the power converter shown in FIG. 2.
Figure 3:
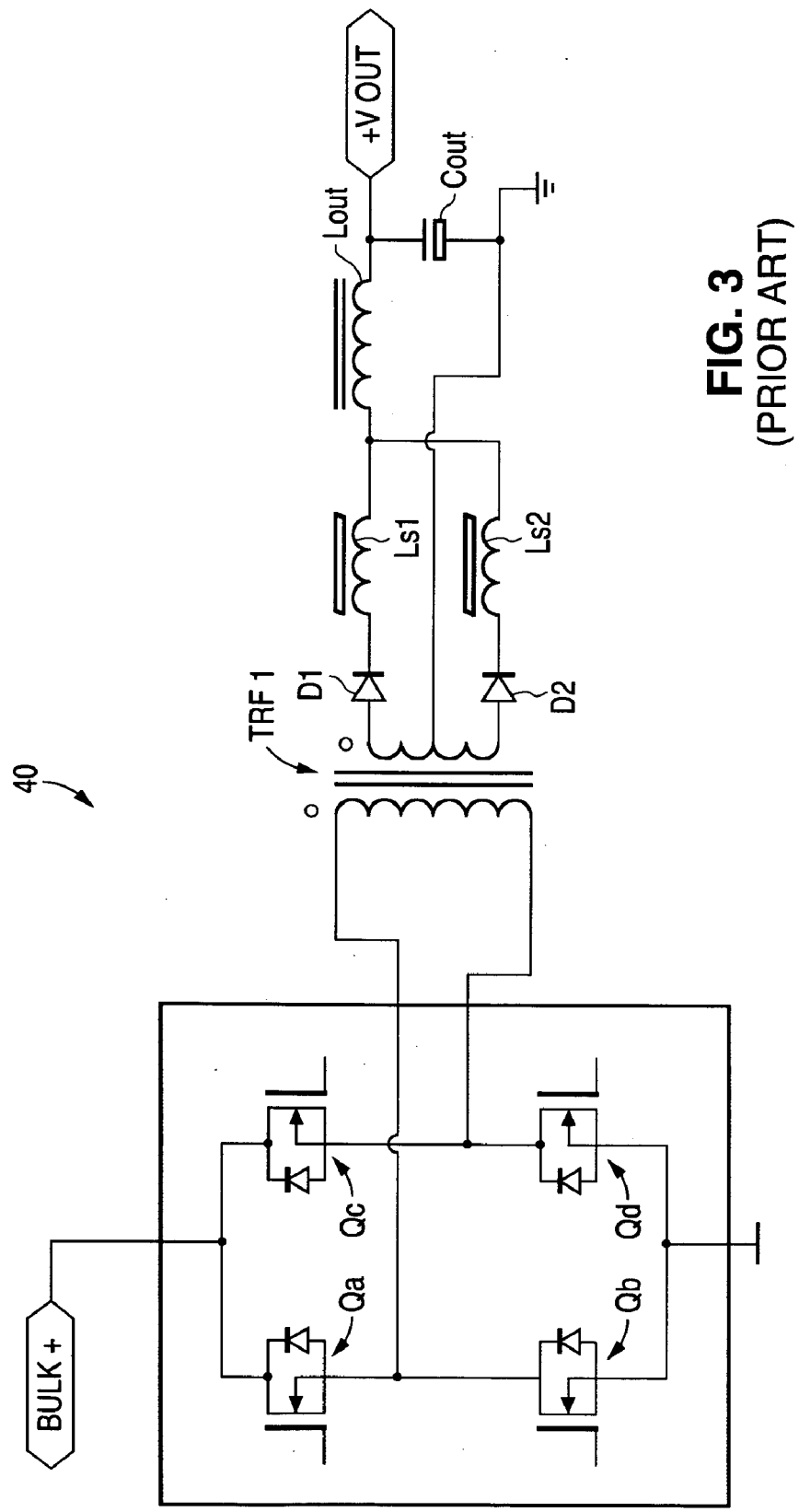
FIG. 3 is a prior art full bridge converter including two saturable inductors in series with secondary side rectifier diodes.
Figure 5B:
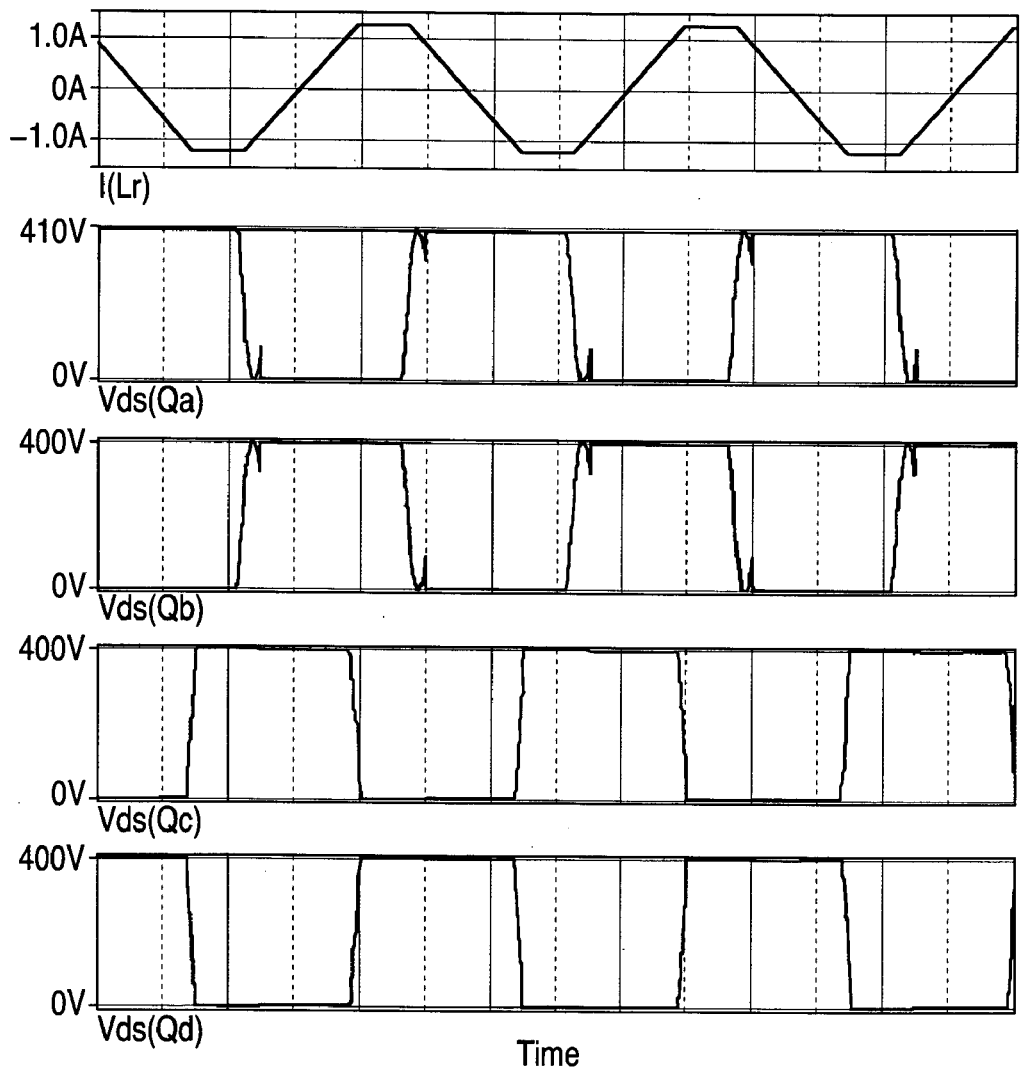
FIG. 5B is set of exemplary voltage and current waveforms for the circuit shown in FIG. 5.

FIG. 5B is set of exemplary voltage and current waveforms for the circuit in FIG. 5. As seen in FIG. 5B, unlike the "near square wave" current in inductor Lr in the waveform in FIG. 2A for the converter in FIG. 2, the current in inductor Lr for the converter in FIG. 5 is triangular. Thus, for the converter in FIG. 5, the inductor Lr handles much lower current, resulting in lower copper and core losses as compared to Lr in FIG. 2. Inductor Lr in FIG. 5 can therefore be a low cost gapped ferrite inductor, although other suitable energy storage materials can also be used.

Since the energy stored in inductor Lr is independent of load, ZVS action is achieved even at no-load condition. The converter in FIG. 5 provides significant improvement in losses at light load of high frequency ZVS converters, as illustrated in FIG. 5A. FIG. 5A is an exemplary waveform of power loss versus load for the converter shown in FIG. 5. FIG. 5A illustrates that, in contrast to the bridge devices of the conventional ZVS converter shown in FIG. 1, which has high losses at light loads, a substantial improvement at light load and no load is attained according to the present invention. As seen in FIG. 5A, the losses at full load for the converter in FIG. 5 rise marginally, but this is acceptable for most applications. These extra losses at full load for the embodiment shown in FIG. 5 are due to higher currents seen when switching at full load. Alternatively, the circuit of FIG. 5 can be optimized for a particular application by tuning inductor Lr to eliminate the extra loss at full load while allowing marginally higher losses at light load where such losses can be tolerated for the particular application.

Figure 4:
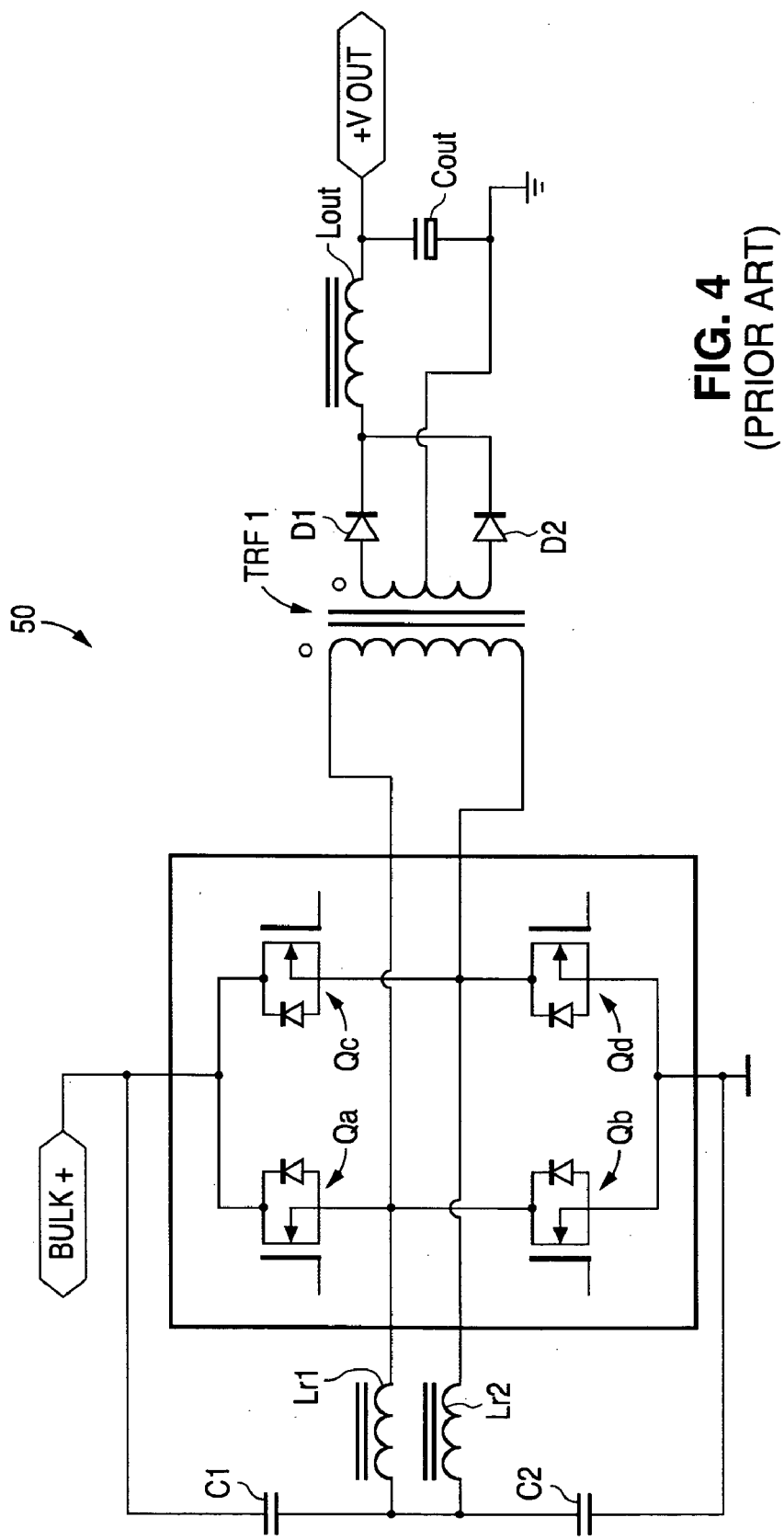
FIG. 4 shows a prior art full bridge converter including two external resonant inductors and two split capacitors for generating a split bulk voltage rail.
Figure 4A:
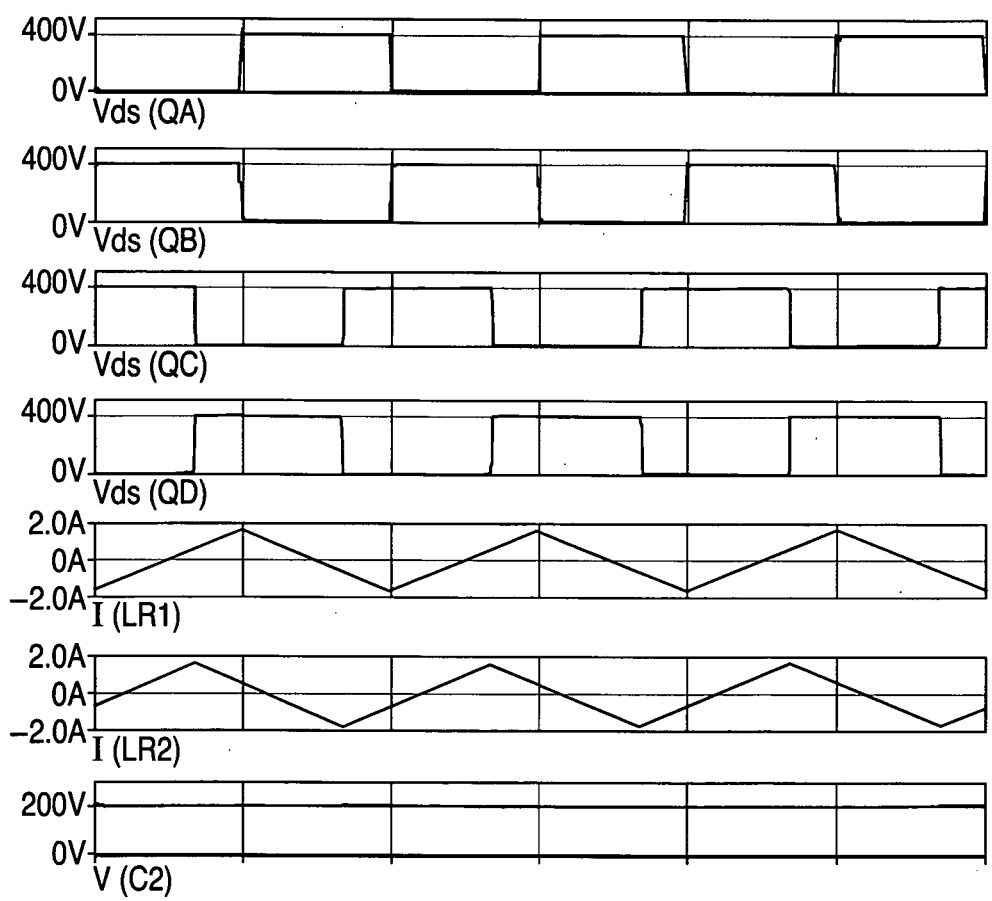
FIG. 4A is a set of voltage and current waveforms illustrating the operation of the power converter in FIG. 4.

As mentioned above, the prior art converter shown in FIG. 4 may provide zero voltage switching down to very light loads for all four full bridge MOSFETS, Qa, Qb, Qc and Qd, if the power transformer is non-ideal, i.e., has high leakage inductance. As compared to the converter in FIG. 4 with a non-ideal transformer, however, the present invention has the advantage of significantly reduced component cost and component count. If the power transformer has very low leakage inductance, then the converter in FIG. 4 can achieve zero voltage switching of the two switches, which turn on after the transformer active period, i.e., the active to passive leg. The other leg, the passive to active leg, will not achieve ZVS action since the energy stored in the ZVS choke would find a discharge path through the power transformer to the secondary side load. In further contrast to the converter of FIG. 4, the series blocking inductance Lblock according to the present invention can provide blocking to achieve the ZVS action for all of the switches.

Figure 6:
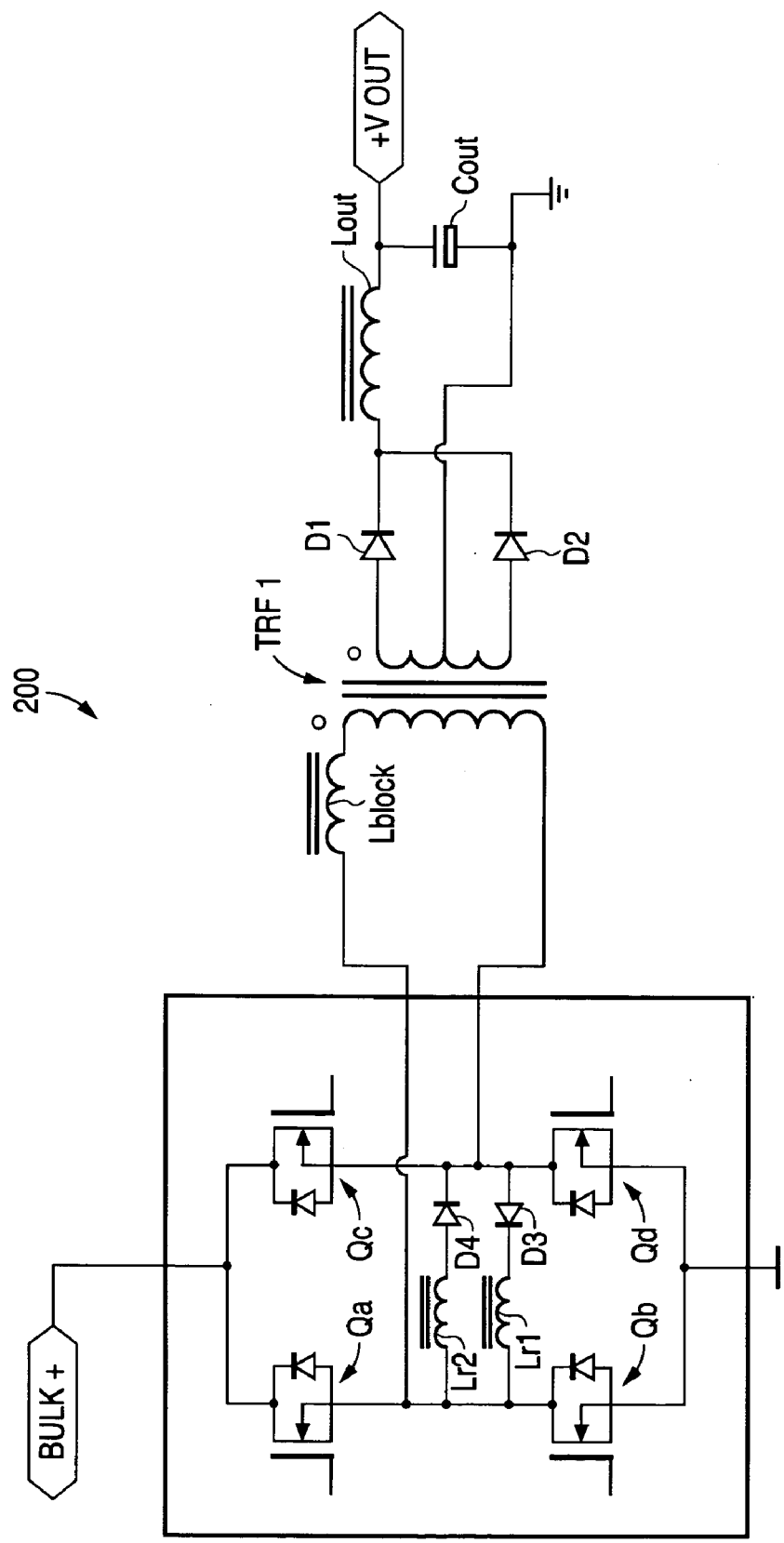
FIG. 6 is an alternative embodiment of the converter of the present invention that includes two resonant inductors.
Figure 6A:
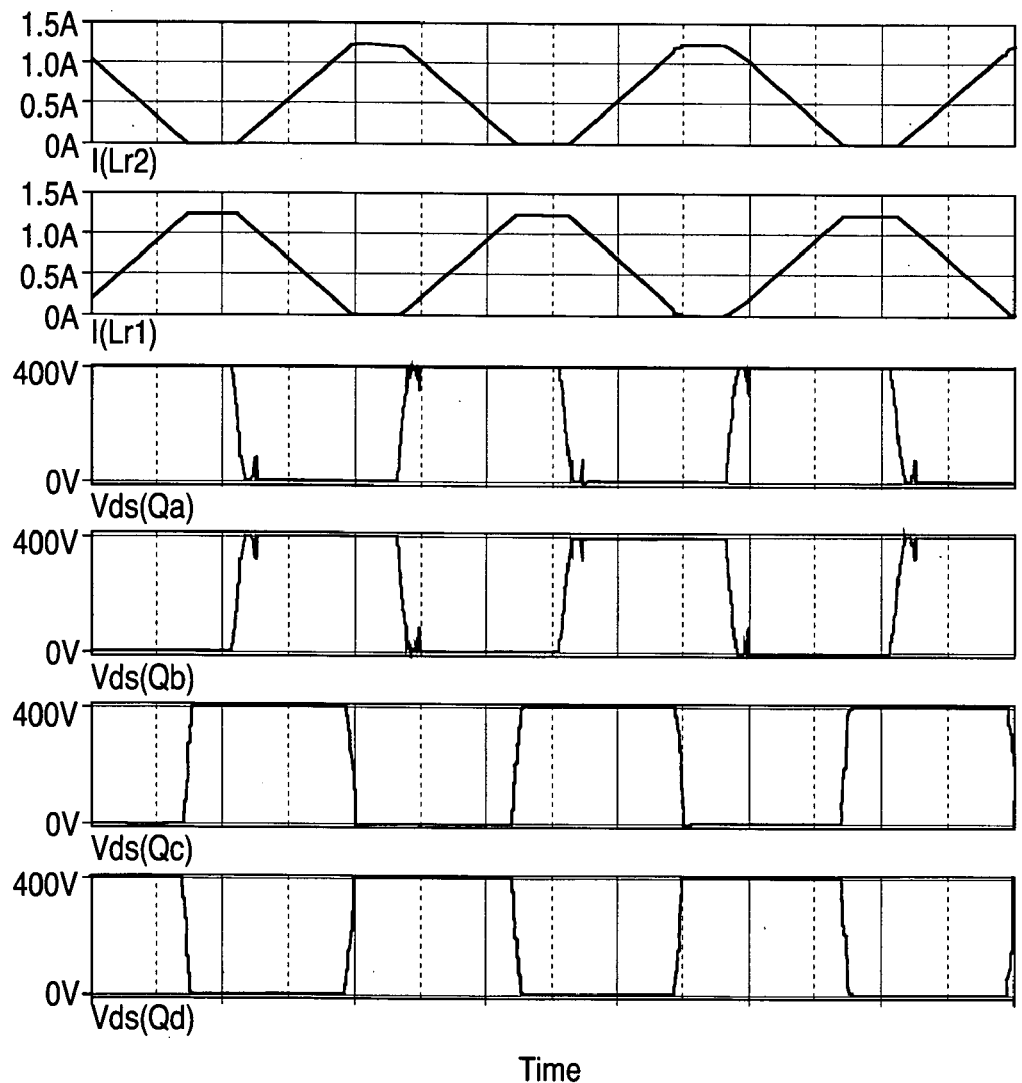
FIG. 6A shows a set of voltage and current waveforms and component values for the circuit shown in FIG. 6.

FIG. 6 is an alternative embodiment of the converter of the present invention that includes two resonant inductors. Power converter 200 includes an inductor Lr1 connected in series with a diode D3 between the bridge outputs, and an inductor Lr2 connected in series with a diode D4 between the bridge outputs. Each of the inductors Lr1, Lr2 operates in a discontinuous mode and for only half the switching period. FIG. 6A shows a set of waveforms and component values for an exemplary circuit shown in FIG. 6. In operation, when the diagonal switches Qa–Qd in FIG. 6 are on, current builds up in inductor Lr2, through diode D4, due to the voltage applied across inductor Lr2. As a result, energy is stored in the inductor Lr2. When switches Qa and Qd are turned off, this energy in inductor Lr2 is used for the ZVS action of the other two switches, Qb and Qc. When the diagonal Qb–Qc is on, the same action occurs using inductor Lr1 and diode D3. The alternative embodiment in FIG. 6 provides a choice of splitting the heat dissipation of inductor Lr into two inductors in order to achieve the spreading of heat dissipation, a design choice which may be desirable in order to meet certain packaging conditions.

The circuit of the present invention may also be used in a soft switched half bridge converter.

Figure 7:
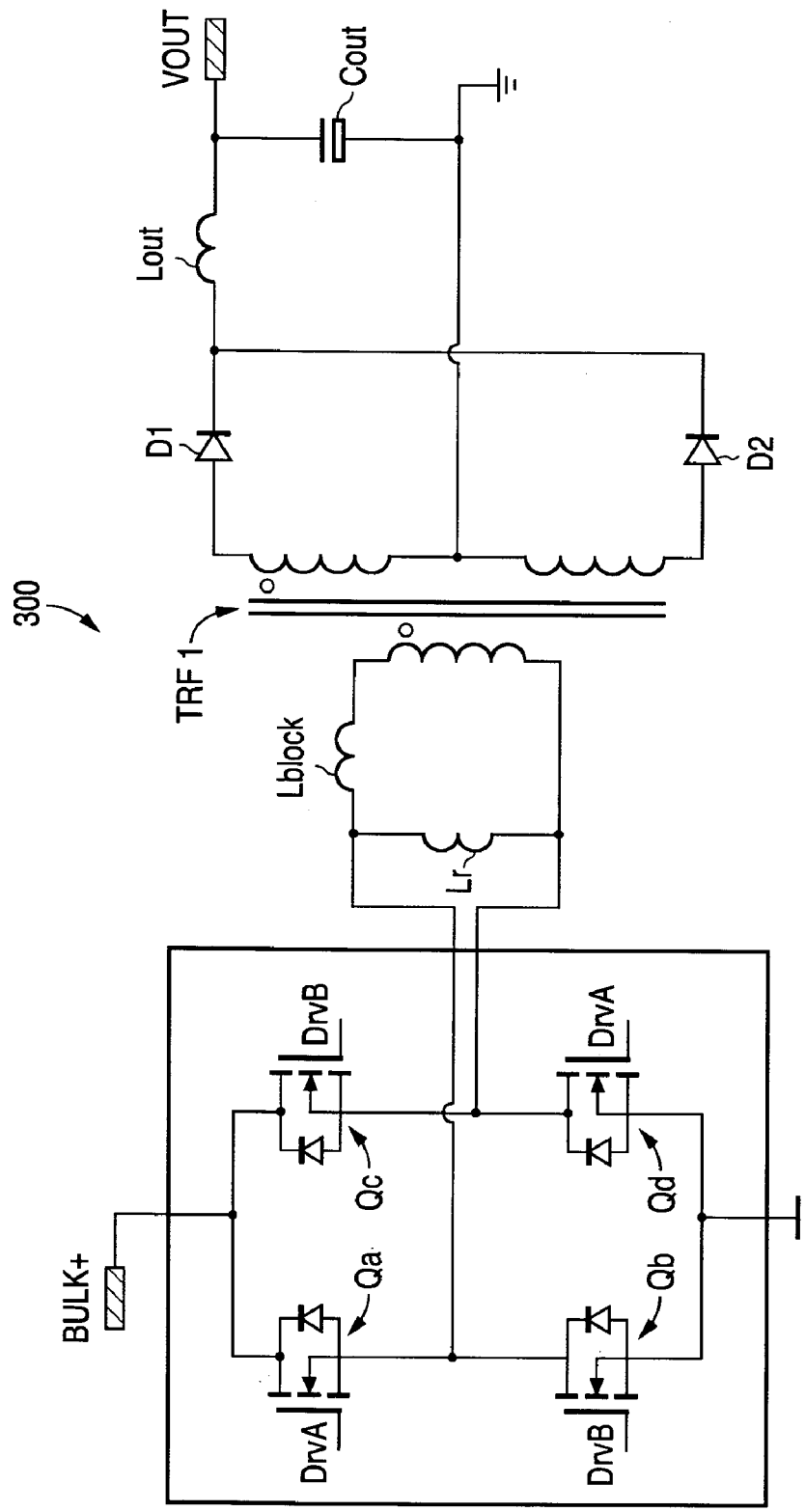
FIG. 7 is an alternative embodiment of the circuit according to the present invention for use in a hard switching full bridge converter.
Figure 7A:
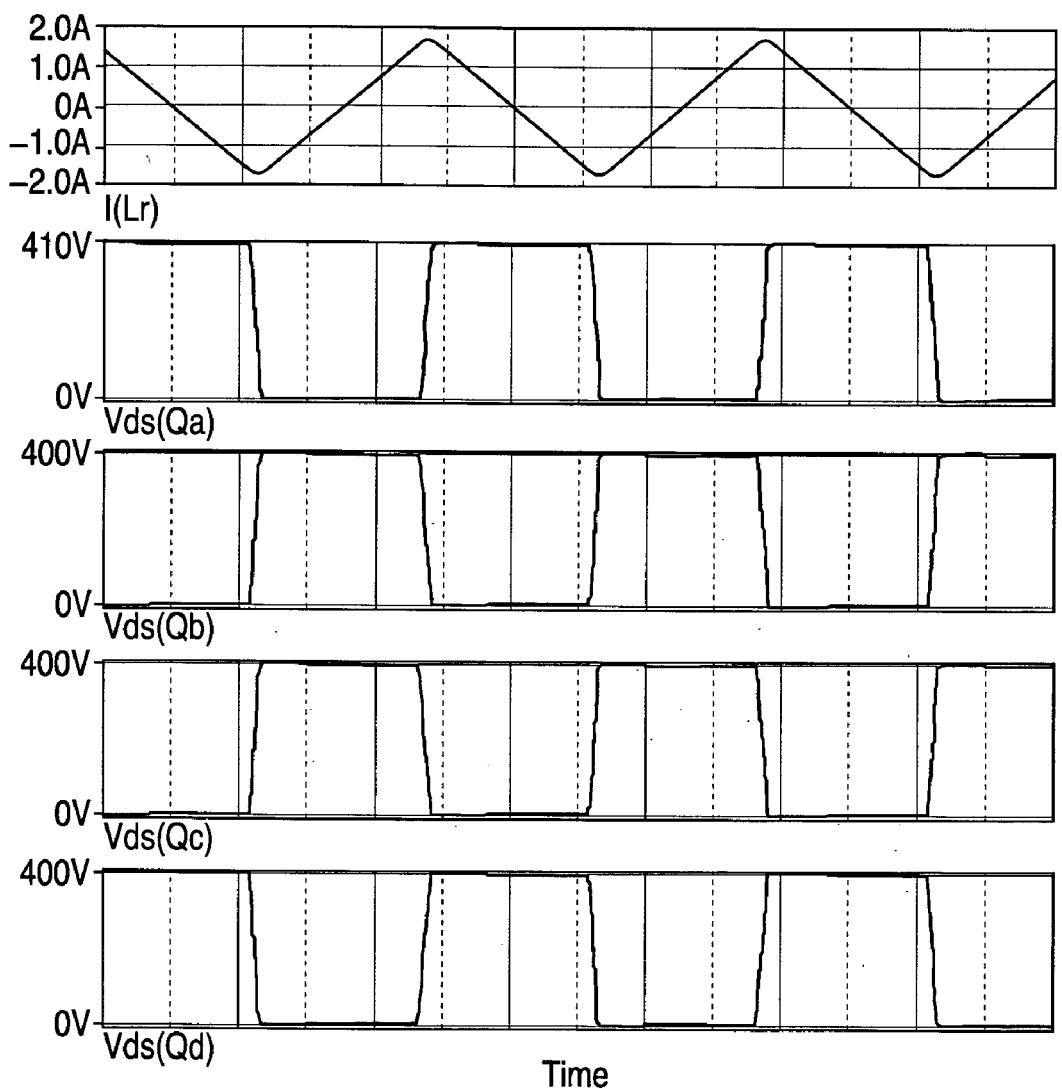
FIG. 7A is a set of waveforms and component values for an exemplary converter in FIG. 7.

FIG. 7 is an alternative embodiment of the circuit according to present invention for use in a hard switching full bridge converter. For a hard switched full bridge converter 300 in FIG. 7, instead of a phase shifted control circuit as used with the circuit in FIG. 5, Qa and Qd are controlled by the same drive signal, DrvA, from a conventional control circuit (not shown) so that these switches turn on and turn off at the same time. After these switches turn off, switches Qc and Qb are turned on at the same time by the same drive signal, DrvB, from a conventional control circuit (not shown). Both of these switch diagonals have the same on period and the pulse width is controlled to regulate the output voltage. Typically, the duty cycle for the hard switched full bridge converter is always less than 50%. In a particular application, if the duty cycle is very close to 50%, e.g., more than about 45%, the circuit of the present invention can be used in a hard switched converter, as seen in FIG. 7, for achieving ZVS. FIG. 7A is a set of waveforms and component values for an exemplary converter in FIG. 7 operating at a 44% duty cycle. Thus, as is seen, the present invention can be used to overcome the basic drawback of hard switching and thereby achieve soft switching.

Figure 8:
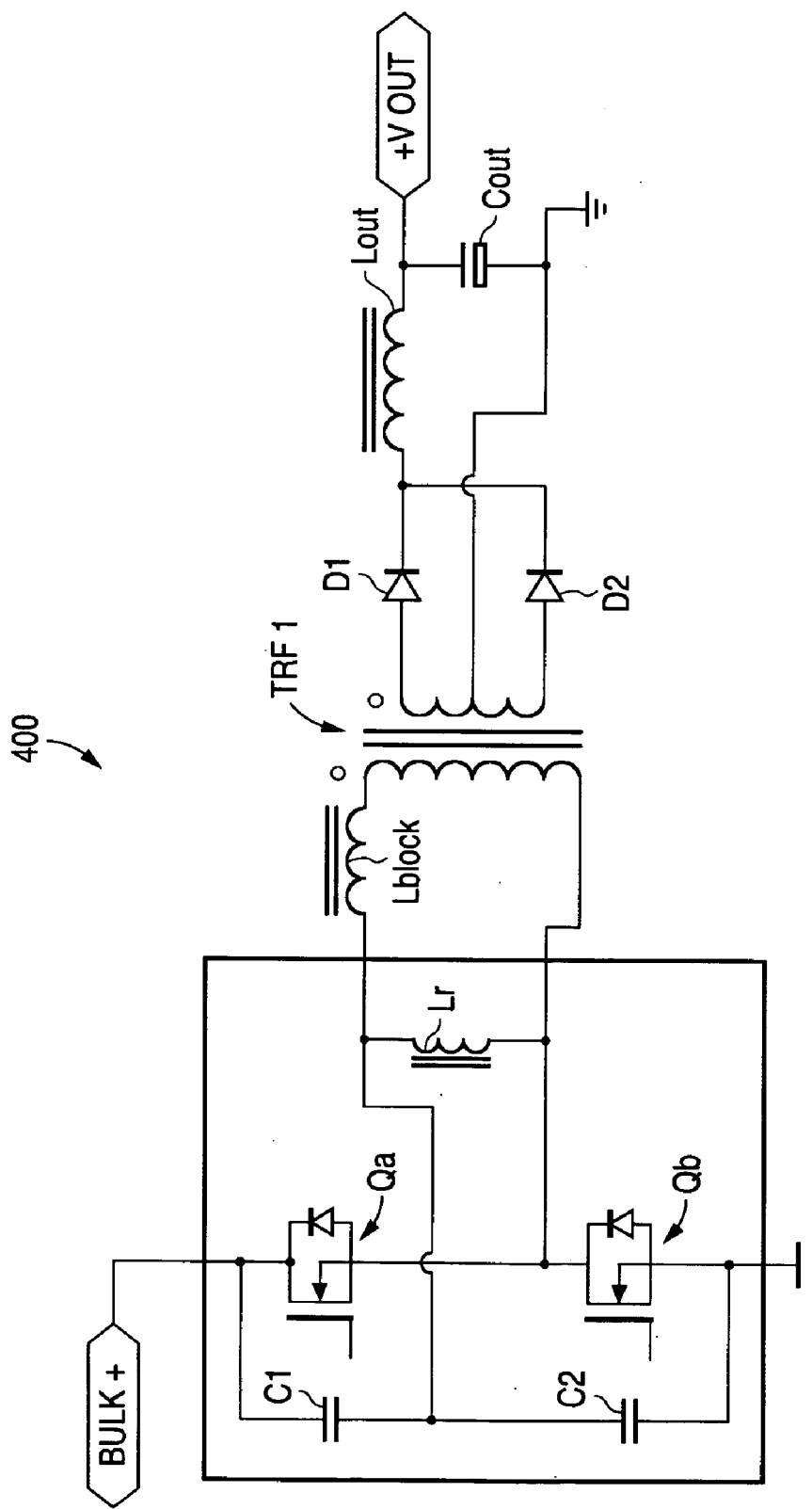
FIG. 8 is an embodiment of the circuit according to the present invention for use in a hard switching half bridge converter.

FIG. 8 is an embodiment of the circuit according to present invention for use in a hard switching half bridge converter. Thus, the present invention can be used to enable a low cost, simple hard switching full bridge or half bridge converter to achieve zero voltage switching, if the operating duty cycle is close to 50%.

As described above, the present invention achieves zero voltage switching of full bridge or half bridge devices even at very light loads, solves the light load power loss issue in soft switching full bridge and half bridge converters operating at high operating frequencies, and reduces cost by enabling use of lower cost components. The present invention can be used in soft switched full bridge as well as half bridge converters. The present invention can also be used to get zero voltage transition switching in hard switched bridge topologies where the operating duty cycle is very large with very short dead time.

Having disclosed exemplary embodiments, modifications and variations may be made to the disclosed embodiments while remaining within the scope of the invention as described by the following claims.

What is claimed is:

1. In a DC-DC converter for providing substantially zero voltage switching (ZVS) having first and second input terminals to which an input DC voltage is coupled and two output terminals where the output DC power is provided, a bridge having a first and second switching leg, each leg comprising two controlled switches connected in series, each switch having a switch capacitance and a control input, each switching leg connected between the input terminals and having a junction point between its series-connected switches, a transformer having a primary winding and a secondary winding each having a first and second end, and a rectifier and output filter circuit coupled between said secondary winding and said output terminals, a circuit for reducing power losses at light loads and enabling very high frequency operation comprising:

a first inductor connected between said junction points for charging and discharging each of said switch capacitances wherein control signals are provided to said control inputs of said switches in said first switching leg so that said first switching leg switches conduct alternately with dead times therebetween; and wherein control signals are provided to said control inputs of said switches in said second switching leg so that said second switching leg switches conduct alternately with dead times therebetween; and wherein each switch capacitance is discharged by said first inductor during its respective switch's dead time; and a second inductor having an end connected to said junction point of said first switching leg and another end connected to said first end of said primary winding, said second end of said primary winding is connected to said junction point of said second switching leg, wherein said second inductor is for providing high impedance to a sudden reversal of current for preventing the current of said first inductor from circulating in said primary winding until after the dead time generated in a corresponding switching leg, such that energy in said first inductor is available for said substantially zero voltage switching and current flowing through said first inductor is smaller than the reflected load current so as to substantially reduce power loss at light loads.

2. The circuit of claim 1, wherein said first inductor is a resonant inductor.

3. The circuit of claim 2, wherein said resonant inductor is tunable to reduce power loss under a full load condition of said converter and to allow higher power loss under a light load condition of said converter.

4. The circuit of claim 1, wherein said transformer has a leakage inductance above a predetermined amount and said second inductor comprises said leakage inductance.

5. The circuit of claim 1, wherein substantially complementary control signals are provided to said control inputs of said switches in said first switching leg; and wherein relatively phase shifted substantially complementary control signals are provided to said control inputs of said switches in said second switching leg.

6. The circuit of claim 1, wherein substantially complementary control signals are provided to said control inputs of said switches in said first switching leg; and wherein said substantially complementary control signals are provided to said control inputs of said switches in said second switching leg; so as to provide hard switching such that one of said switches of said first leg is controlled to switch on and off at the same time as a corresponding one of said switches of said second leg.

7. The circuit of claim 1, wherein each of said switches is a MOSFET.

8. The circuit of claim 1, wherein each said junction point provides a voltage mid-way between the voltages of the input terminals.

9. The circuit of claim 1, wherein the secondary winding has a center tap and the rectifier and output filter circuit comprises a third inductor, two diodes each connected between a respective end of the secondary winding and one end of said third inductor for providing full wave rectification, and a capacitor coupled between another end of the third inductor and the center tap of the secondary winding.

10. The circuit of claim 1, wherein said second inductor comprises a saturable choke.

11. The circuit of claim 1, wherein said transformer has a core and said first inductor is integrated into said transformer as a magnetizing inductance by gapping said core.

12. A DC-DC converter for providing substantially zero voltage switching (ZVS) having first and second input terminals to which an input DC voltage is coupled and two output terminals where the output DC power is provided comprising:
  a bridge having a first and second switching leg, each leg comprising two controlled switches connected in series, each switch having a switch capacitance, each switching leg connected between the input terminals and having a junction point between its series-connected switches;
  a transformer having a primary winding and a secondary winding each having a first and second end;
  a rectifier and output filter circuit coupled between said secondary winding and said output terminals;
  a first and a second diode;
  a first inductor connected in series with said first diode between said junction points; and
  a second inductor connected in series with said second diode between said junction points; wherein said first diode has a cathode connected to an end of said first inductor and an anode connected to said junction point of said second switching leg and said second diode has a cathode connected to the anode of said first diode and an anode connected to an end of said second inductor; and
  a third inductor for providing high impedance to a sudden reversal of current having an end connected to said junction point of said first switching leg and another end connected to said first end of said primary winding, said second end of said primary winding is connected to said junction point of said second switching leg.

13. The converter of claim 12, wherein said first and second inductors operate in a discontinuous mode and for only half of a switching cycle of said converter.

14. The converter of claim 12, wherein said third inductor is a saturable choke.

15. The converter of claim 12, wherein said transformer has a leakage inductance above a predetermined amount and said third inductor comprises said leakage inductance.

16. The converter of claim 12, wherein the series combination of said first inductor and first diode is connected in parallel to the series combination of said second inductor and said second diode and to the series combination of said third inductor and said primary winding.

17. A DC-DC converter for providing substantially zero voltage switching (ZVS) having first and second input terminals to which an input DC voltage is coupled and two output terminals where the output DC power is provided comprising:
  a bridge having a switching leg comprising two controlled switches connected in series, each switch having a switch capacitance and a control input, said switching leg connected between the input terminals and having a junction point between its series-connected switches;
  a transformer having a primary winding and a secondary winding each having a first and second end;
  a rectifier and output filter circuit coupled between said secondary winding and said output terminals;
  a capacitive voltage divider formed by a first and a second capacitor and connected between said input terminals,
  a first inductor connected between said junction point of said switching leg and a junction between said first and second capacitor wherein control signals are provided to said control inputs of said switches in said first switching leg so that said first switching leg switches conduct alternately with dead times therebetween; and wherein control signals are provided to said control inputs of said switches in said second switching leg so that said second switching leg switches conduct alternately with dead times therebetween; and wherein each switch capacitance is discharged by said first inductor during its respective switch's dead time; and
  a second inductor having an end connected to said junction between said capacitors and another end connected to said first end of said primary winding, said second end of said primary winding is connected to said junction point of said switching leg, wherein said second inductor is for providing high impedance to a sudden reversal of current for preventing the current of said first inductor from circulating in said primary winding until after the dead time generated in a corresponding switching leg, such that energy in said first inductor is available for said substantially zero voltage switching and current flowing through said first inductor is smaller than the reflected load current so as to substantially reduce power loss at light loads.

18. A method of operating a bridge DC-DC converter for substantially zero voltage switching, said converter having first and second input terminals to which an input DC voltage is coupled and two output terminals where the output DC power is provided and which comprises a bridge having two switching legs, each leg comprising two controlled switches connected in series, each switch having a switch capacitance and a control input, each switching leg connected between the input terminals and having a junction point between its series-connected switches, a transformer having a primary winding and a secondary winding each having a first and second end, and a secondary circuit for deriving an output of the converter from said secondary winding, comprising the steps of:
  supplying substantially complementary control signals to said control inputs of said switches in said first switching leg so that the corresponding switches conduct alternately with dead times therebetween;
  supplying relatively phase shifted substantially complementary control signals to said control inputs of said switches in said second switching leg so that the corresponding switches conduct alternately with dead times therebetween; and
  during the dead time when one of said switches in said first switching leg has been turned off, charging the switch capacitance of said turned-off switch and discharging the switch capacitance of the other said switch in said first switching leg via a resonant inductor connected between said junction points;
  during the dead time when one of said switches in said second switching leg has been turned off, charging the switch capacitance of said turned-off switch and discharging the switch capacitance of the other said switch in said second switching leg via said resonant inductor connected between said junction points; and
  preventing the current of said resonant inductor from circulating in said primary winding until after the dead time generated in a corresponding switching leg via a second inductor; said second inductor having an end connected to said junction point of said first switching leg and another end connected to said first end of said primary winding, said second inductor connected in a series combination with said primary winding between said junction points such that said series combination is in parallel with said resonant inductor, such that energy in said resonant inductor is available for said soft substantially zero voltage switching and current flowing through said resonant inductor is smaller than the reflected load current so as to substantially reduce power loss at light loads.

* * * * *